(12) United States Patent
Grundmann et al.

(10) Patent No.: US 11,200,487 B1
(45) Date of Patent: Dec. 14, 2021

(54) OPTICAL PROCESSING SYSTEM

(71) Applicant: X Development LLC, Mountain View, CA (US)

(72) Inventors: Michael Jason Grundmann, San Jose, CA (US); Sylvia Joan Smullin, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 936 days.

(21) Appl. No.: 15/452,184

(22) Filed: Mar. 7, 2017

Related U.S. Application Data

(60) Provisional application No. 62/440,750, filed on Dec. 30, 2016.

(51) Int. Cl.
*G06N 3/067* (2006.01)
*G02F 1/35* (2006.01)
*G06N 3/04* (2006.01)

(52) U.S. Cl.
CPC ............ *G06N 3/0675* (2013.01); *G02F 1/35* (2013.01); *G06N 3/04* (2013.01)

(58) Field of Classification Search
CPC ...... G06N 3/0454; G06N 3/08; G06N 3/0675; G06N 3/04; G06T 2207/20084; G06T 2207/20081; G06T 7/11; G06K 9/4628; G06K 9/6256; G02F 1/35
See application file for complete search history.

(56) References Cited

U.S. PATENT DOCUMENTS

| | | | | |
|---|---|---|---|---|
| 4,637,056 A | * | 1/1987 | Sherman | G06E 3/005 359/1 |
| 4,809,340 A | * | 2/1989 | Mersereau | G06E 3/005 209/584 |
| 6,529,614 B1 | * | 3/2003 | Chao | G06K 9/3241 382/103 |
| 7,091,466 B2 | * | 8/2006 | Bock | H01L 27/14609 250/208.1 |

(Continued)

FOREIGN PATENT DOCUMENTS

KR     20180064884 A  *  6/2018

OTHER PUBLICATIONS

Tomlinson Jr., et al., "A Digital Neural Network Architecture for VLSI," 1990, International Joint Conference on Neural Networks, IEEE, pp. 545-550 (Year: 1990).*

(Continued)

*Primary Examiner* — Miranda M Huang
*Assistant Examiner* — Catherine F Lee
(74) *Attorney, Agent, or Firm* — Fish & Richardson P.C.

(57) ABSTRACT

Methods, systems, and apparatus for performing convolutional computations using an optical system. In some aspects computations for a neural network are performed in a digital domain using electronic circuitry, the neural network including a convolutional layer. Input data for the convolutional layer of the neural network is obtained, and a convolution or correlation computation on the input data in an analog domain using an optical correlator module is performed to generate an optical correlator module output. Based on the optical correlator module output, data is processed through additional layers of the neural network in the digital domain using the electronic circuitry.

18 Claims, 7 Drawing Sheets

(56) References Cited

U.S. PATENT DOCUMENTS

2017/0186176 A1* 6/2017 Paluri .................. G06K 9/4628

OTHER PUBLICATIONS

LeCun et al., "Deep Learning," May 2015, Nature, vol. 521, pp. 436-444 (Year: 2015).*

Elagouni et al., "A Comprehensive Neural-Based Approach for Text Recognition in Videos using Natural Language Processing," Apr. 2011, ACM International Conference on Multimedia Retrieval, 9 pages (Year: 2011).*

Yu et al., "Optical Pattern Recognition: Architectures and Techniques," May 1996, Proceedings of the IEEE, vol. 84, No. 5, pp. 733-752 (Year: 1996).*

'www.cambridgecorrelators.com' [online] "Types of Optical Correlator," Mar. 4, 2016, [retrieved on Feb. 14, 2017] Retrieved from Internet: URL< http://www.cambridgecorrelators.com/types.html> 1 page.

'www.spie.org' [online] "Real-time optical processor using a digital micromirror device," Chao et al., 2014, [retrieved on Feb. 14, 2017] Retrieved from Internet: URL< http://spie.org/newsroom/5431-real-time-optical-processor-using-a-digital-micromirror-device?ArticleID=x108319> 3 pages.

Abookasis et al., "Digital Correlation Hologram Implemented on Optical Correlator," Proceedings of PSIE vol. 5202 Optical Information Systems, edited by Bahram Javidi, Demetri Psaltis (SPIE, Bellingham, VA 2003, 10 pages.

Casasent. "General-Purpose Optical Pattern Recognition Image Processors," Proceeding of the IEEE 82,11, Nov. 1994, 11 pages.

Foor et al. "Adaptive, Optical, Radial Basis Function Neural Network for Handwritten Digit Recognition," Applied Optics 34(32), Nov. 10, 1995, 11 pages.

Foor et al. "Optical Correlator Optimizations and Extensions for Automated Optical Target Recognition," No. RL-TR-94-220, Rome Lab Griffiss AFB NY, Dec. 1994, 41 pages.

Harasthy et al. "Optical Correlator Based Traffic Signs Recognition," IWSSIP, Apr. 11-13, 2012, Vienna, Austria, 4 pages.

Kodate et al. "Compact Parallel Optical Correlator for Face Recognition, and its Application," Face Recognition, Jun. 2007, 15 pages.

Monjur et al. "Hybrid Optoelectronic Correlator Architecture for Shift Invariant Target Recognition," JOSA A. 31.1, Jan. 1, 2014, 8 pages.

Serrano-Heredia et al. "Optical Implementation of a Convolutional Kernel by using a Joint Transform Correlator to Perform Image Processing Operation," Proceeding of SPIE vol. 5202 Optical Information Systems, Nov. 3, 2003, 8 pages.

Vander Lugt. "Signal Detection by Complex Spatial Filtering," Report of Project Michigan, Institute of Science and Technology, University of Michigan, Radar Laboratory, Jul. 1963, 56 pages.

Zheng et al. "Full-range in-plane rotation measurement for image recognition with hybrid digital-optical correlator," Optical Engineering 53(1), 011003, Jan. 2014, 10 pages (.

Chang et al. "Hybrid optical-electronic convolutional neural networks with optimized diffractive optics for image classification," Scientific Reports 8(1), Aug. 17, 2018, 10 pages.

* cited by examiner

OPTICAL PROCESSING SYSTEM

CROSS-REFERENCE TO RELATED APPLICATION

This application claims the benefit of U.S. Application No. 62/440,750, filed Dec. 30, 2016, the contents of which are incorporated by reference herein.

TECHNICAL FIELD

This specification relates to optical processing systems, including optical modules that accelerate processing of neural networks.

BACKGROUND

Neural networks are machine learning models that employ one or more layers of nonlinear units to predict an output for a received input. Some neural networks include one or more hidden layers in addition to an output layer. The output of each hidden layer is used as input to another layer in the network, e.g., the next hidden layer or the output layer. Each layer of the network generates an output from a received input in accordance with current values of a respective set of parameters.

Some neural networks include one or more convolutional neural network layers. The parameters for a convolutional neural network layer include a set of learnable convolution kernels or filters. When processing a convolutional neural network layer input, each kernel is convolved across the width and height of the input volume.

SUMMARY

In some implementations, a system includes an optical processing module that accelerates the processing of a digital electronic system. For example, the optical processing module can act as a co-processor or hardware accelerator module running alongside digital circuitry for neural network processing. The digital circuitry can perform processing for some portions of the neural network, e.g., one or more network layers, electronically in the digital domain. The optical processing module performs processing for other portions of the neural network, e.g., one or more other neural network layers, optically in the analog domain. This arrangement allows the system to take advantage of the most efficient processing capabilities of both digital and optical processors in a single neural network.

Convolutional computations have applications in various fields such as image processing, digital data processing, acoustics, and signal processing. For example, convolutional computations may be used to filter, compress, simulate, smooth, correlate or detect edges in images. Convolutional neural networks apply multiple cascaded convolution kernels with applications in machine vision and artificial intelligence. In the field of neural networks, the convolutional neural network layer is often used to represent operations that are not strictly convolutions in the traditional sense. Rather, some convolutional neural network layers perform convolution, correlation such as cross correlation, or other operations on a subset of an input. The optical processing systems discussed herein can be configured to perform any of these operations to replicate or approximate the operations of a convolutional neural network layer in an accelerated manner.

Many systems that process neural networks use digital electronic processing techniques. Digital systems that implement convolutional layers of a neural network generally operate in the time domain or spatial domain. In these digital systems, a typical convolutional computation requires a large number of multiplications, e.g., to compute the inner product of a kernel and a neighborhood of each point of an input signal. The complexity of a convolutional computation scales with input size and kernel size. In some settings, such as those with large input sizes or large kernel sizes, performing a convolutional computation may be very costly in terms of computation time and computational resources, and may be a cause for bottlenecks or other system inefficiencies.

Convolutional processing can be performed more efficiently in the frequency domain. For example, the equivalent to a convolution operation in the time domain may be obtained by a pointwise product of frequency domain data. The computational complexity of a convolutional computation performed in the frequency domain may be lower than the complexity of the same convolutional computation performed in the time domain or spatial domain. In some settings, such as those with large input sizes or kernel sizes, performing a convolutional computation in the frequency domain may therefore reduce processing demands associated with the convolutional computation, e.g., computation time and computational resources. Nevertheless, transforming data between the time domain and frequency domain often requires additional processing, e.g., using a Fourier transform and inverse Fourier transform, which may not be ideal for digital systems.

This specification describes systems and methods for outsourcing the performance of convolutional computations to an analog optical processor instead of using a digital electronic processor. The analog optical processor efficiently performs convolution operations using light. For example, a convolutional neural network, implemented using electronic circuitry in the digital domain, may use the optical system to perform convolutional neural network layer computations. The optical system may utilize properties of lenses to efficiently perform the convolutional computations. For example, in cases where the optical system operates on coherent light, the optical system may utilize the Fourier transforming properties of a lens to efficiently perform convolutional computations in the Fourier domain. In cases where the optical system operates on incoherent light, the optical system may utilize how lenses can change the direction of light that passes through them to perform convolutional computations directly. In each case, the optical system may provide results of the convolutional computations to the convolutional neural network for further processing. For example, the convolutional neural network may process data representing the results of the convolutional computations through additional neural network layers to generate a convolutional neural network output.

The systems and methods described in this specification may be applied to any setting where a convolutional neural network implemented using electronic circuitry in a digital domain performs convolutional computations. For example, convolutional neural networks may be used in image recognition systems, e.g., for facial recognition tasks, object classification or object detection. As another example, convolutional neural networks may be applied to natural language processing tasks, e.g., speech recognition, machine translation, semantic parsing, sentence modeling, classification or prediction. As a further example, convolutional neural networks have been used to play games, such as Go.

Innovative aspects of the subject matter described in this specification may be embodied in methods that include the actions of: performing computations for a neural network in a digital domain using electronic circuitry, the neural network comprising a convolutional layer; obtaining input data for the convolutional layer of the neural network; performing a convolution or correlation computation on the input data in an analog domain using an optical correlator module to generate an optical correlator module output; and based on the optical correlator module output, processing data through additional layers of the neural network in the digital domain using the electronic circuitry.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the optical correlator module operates in parallel with the electronic circuitry.

In some implementations, the optical correlator module includes one or more programmable filter devices, and the convolutional layer includes parameters that specify one or more convolution kernels for the convolutional neural network layer. Performing the convolution or correlation operation includes setting parameters of the one or more programmable filter devices to provide a filter corresponding to the one or more convolution kernels for the convolutional neural network layer.

In some implementations, setting parameters of the one or more programmable filter devices to provide a filter corresponding to the one or more convolution kernels for the convolutional neural network layer includes scaling (i) the parameters that specify the one or more convolution kernels for the convolutional neural network layer, and (ii) the obtained input data. Performing the convolution or correlation computation on the input data further includes scaling an output from the optical correlator module to generate the optical correlator module output.

In some implementations, scaling the parameters includes mapping digital values to light intensities in a range from no light to a maximum light intensity.

In some implementations, the optical correlator module includes: a projector element configured to transform coherent light according to a received optical correlator input signal; a first lens configured to perform a Fourier transform on light transmitted by the projector element, where light passing through the first lens is directed to the one or more programmable filter devices; and an imager element configured to detect light and to generate an optical correlator output signal based on the detected light.

In some implementations, the optical correlator module further includes a second lens configured to perform a Fourier transform on light that passes through the one or more programmable filter devices, and the imager element is configured to detect light passing through the second lens.

In some implementations, the optical correlator module includes a non-linear element.

In some implementations, the non-linear element is configured to perform pooling operations on information generated by the optical correlator module.

In some implementations, performing a convolution computation on the input data in the analog domain using the optical correlator module includes generating an optical correlator input signal based on the received input data. Processing the generated optical correlator input signal using the optical correlator is also performed, and includes: multiplying (i) a programmable filter device defined by a respective kernel for the convolution computation, with (ii) the generated optical correlator input signal in the Fourier domain; and performing a second Fourier transform on the multiplied programmable filter device and generated optical correlator input signal in the Fourier domain.

In some implementations, the neural network includes a pooling layer configured to receive and resize an output from the convolutional layer using a pooling filter, and the optical correlator module is configured to perform pixel binning on a generated optical correlator output signal. The pooling filter defines the pixel binning.

In some implementations, performing a convolution computation on the input data in the analog domain using the optical correlator module includes: performing pixel binning on the processed optical correlator input signal using the optical correlator.

In some implementations, performing multiple convolution computations on the input data in the analog domain using the optical correlator module includes: generating an optical correlator input signal based on the received input data; processing the generated optical correlator input signal using the optical correlator, including, for each of the multiple programmable filter devices defined by respective kernels for the multiple convolution computations; multiplying (i) the programmable filter device, with (ii) the generated optical correlator input signal in the Fourier domain; and performing a second Fourier transform on the multiplied programmable filter device and generated optical correlator input signal in the Fourier domain to generate a respective optical correlator output signal.

In some implementations, the neural network includes multiple convolutional neural network layers and the analog domain includes one or more optical correlator modules. Multiple convolution computations are performed corresponding to the multiple convolutional neural network layers on the input data in the analog domain using the one or more optical correlator modules to generate one or more respective optical correlator module outputs.

In some implementations, each of the multiple convolutional neural network layers includes multiple respective convolutional kernels. Multiple convolution computations are performed corresponding to the multiple convolutional kernels for a respective convolutional neural network layer on the input data in the analog domain using the one or more optical correlator modules to generate one or more respective optical correlator module outputs.

In some implementations, performing multiple convolution computations includes: performing a first convolution corresponding to a first convolutional layer on the input data using the one or more optical correlator modules to generate a respective first optical correlator module output; and sequentially performing subsequent convolutions corresponding to subsequent convolutional layers on subsequent optical correlator module outputs using the one or more optical correlator modules to generate a final optical correlator module output.

In some implementations, the optical correlator module includes: a lens configured to direct incoherent light over the one or more programmable filter devices; and an imager element configured to detect light and to generate an optical correlator output signal based on the detected light.

In some implementations, processing data through additional layers of the neural network in the digital domain using the electronic circuitry includes: providing the generated respective optical correlator module output as input to the additional layers of the neural network; and processing the generated respective optical correlator module output and subsequent additional layer outputs using the additional layers to generate a neural network output.

In some implementations, the neural network has been trained (i) in the digital domain to perform a classification task, or (ii) in the digital domain and analog domain using the optical correlator module to perform a classification task.

The subject matter described in this specification can be implemented in particular embodiments so as to realize one or more of the following advantages. A system using optical correlator modules to perform convolutional computations, as described in this specification, combines the best of digital computation and analog computation. The system may combine light speed Fourier transforms with digital electronics. Convolutional computations may be performed faster and using lower power than the same computations performed entirely on a digital computer.

A system using optical correlator modules to perform convolutional computations, as described in this specification, may be used to implement larger convolutional kernels compared to systems that perform convolutional computations in a digital domain only. In addition, the system described in this specification does not suffer from numerical errors, e.g., truncation errors or wraparound errors, which can be introduced by systems that operate in the digital domain only. Convolutional computations performed by the system described in this specification may therefore be more accurate than convolutional computations performed by other systems.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system and method for performing convolutional computations using an optical system in an analog domain. For example, a convolutional neural network in a digital domain may outsource a convolutional computation associated with a particular convolutional neural network layer to an optical correlator module in an analog domain. The optical correlator module may receive input data for the convolutional neural network layer and process the input data to generate a respective convolutional output. The optical correlator module may provide the generated convolutional output to the convolutional neural network, where it may be processed by additional layers of the neural network in the digital domain.

Figure 1A:
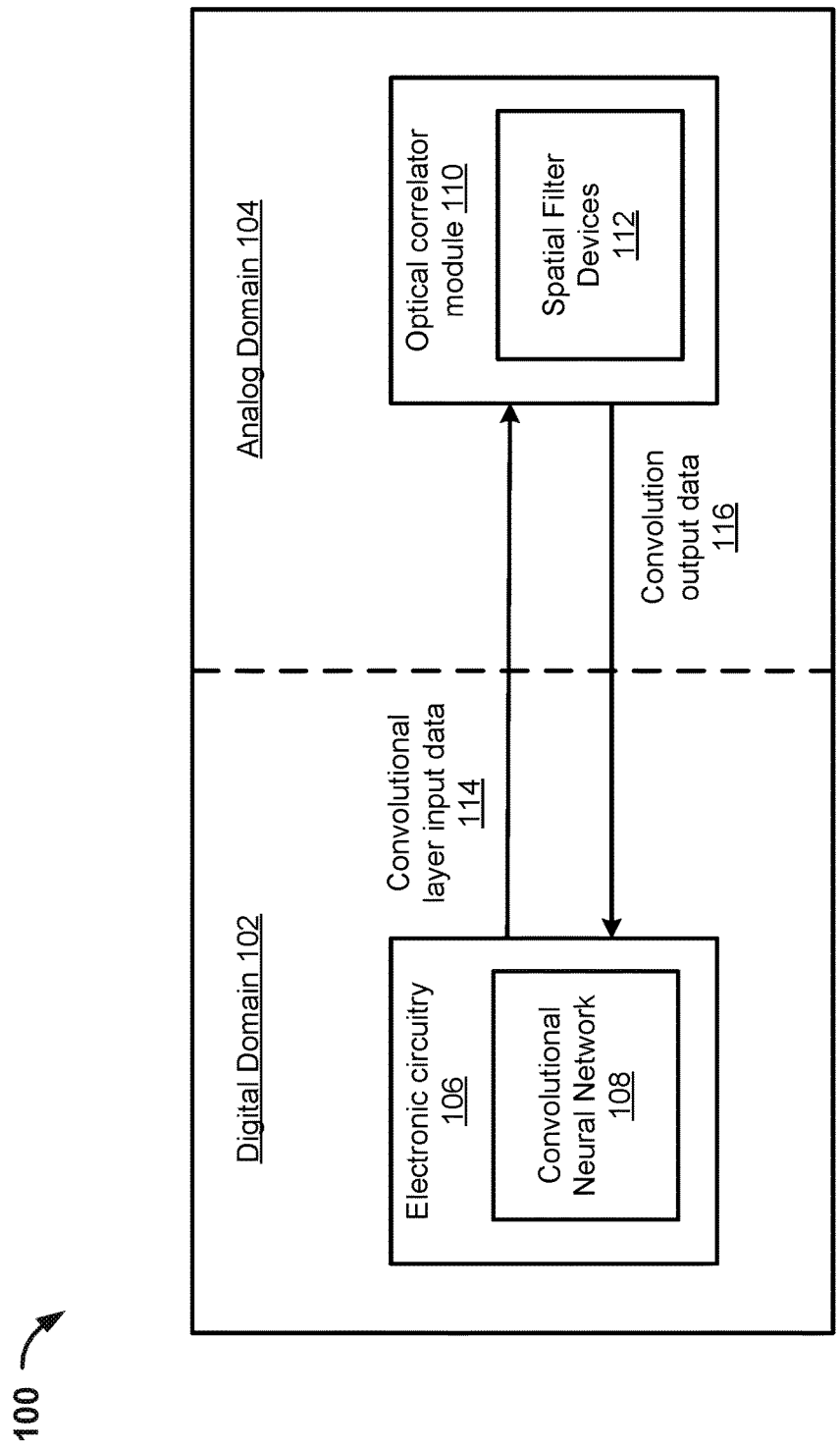
FIG. 1A depicts an example system for performing convolutional computations using an optical correlator module.

FIG. 1A depicts an example system 100 for performing convolutional computations using an optical correlator module. The left hand side of FIG. 1A includes components of the example system 100 that reside in a digital domain 102. The right hand side of FIG. 1A includes components of the example system 100 that reside in an analog domain 104. The components of the digital domain 102 and the analog domain 104 are in data communication with one another, e.g., through the use of a data conversion module as described below with reference to FIG. 3.

The digital domain includes electronic circuitry 106. The electronic circuitry 106 includes digital electronic circuits that are configured to process digital signals. In particular, the electronic circuitry 106 includes a convolutional neural network 108.

Figure 1B:
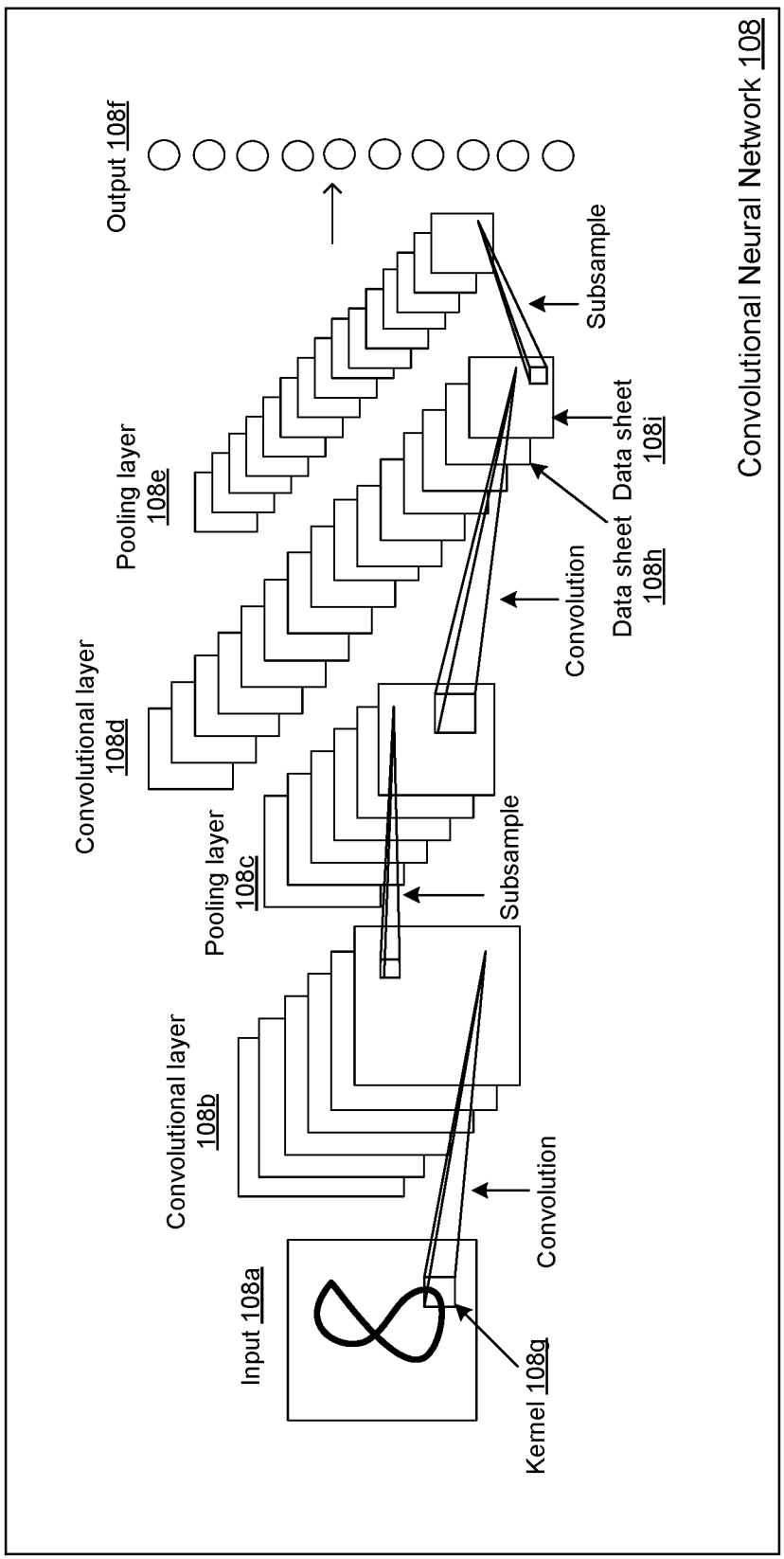
FIG. 1B depicts an example convolutional neural network.

An example convolutional neural network 108 is shown in FIG. 1B. A convolutional neural network is a neural network that includes one or more convolutional neural network layers, e.g., convolutional neural network layers 108b and 108d. For convenience, the convolutional neural network 108 includes two convolutional neural network layers, however in some implementations the convolutional neural network 108 may include more or fewer convolutional neural network layers. The convolutional neural network 108 may also include any number of other neural network layers that are not convolutional neural network layers, e.g., fully connected neural network layers. FIG. 1B also shows data sheets 108h, 108i, a pooling layer 108e, and output 108f.

A convolutional neural network layer, e.g., convolutional neural network layer 108b or 108d, is a neural network layer whose neurons, or nodes, are logically arranged. For example, the neurons may be arranged in a three dimensional array: width, height and depth. Neurons inside a convolutional neural network layer are usually connected to a small region of a layer preceding the convolutional neural network layer, called a receptive field or kernel patch, as illustrated in FIG. 1B. In other words, the locality of features in one region of a layer defines data points in the next layer. Each neuron inside a convolutional neural network layer detects a same feature, constituting the property of translation invariance.

A convolutional neural network layer is associated with a corresponding set of convolutional kernels, e.g., kernel 108g, that store current values of the parameters of the layer. For example, convolutional neural network layer 108b is associated with six convolutional kernels and convolutional neural network layer 108d is associated with fifteen convolutional kernels. Each kernel may be represented as a two-dimensional array, e.g., a matrix, or as a higher dimensional array, e.g., an n-dimensional tensor. Generally, the dimensionality of each kernel may depend on the dimensionality of an input received by the respective convolutional neural network layer. In cases where a received input is of dimension n>2, a convolution may be performed on the first two dimensions of the received input, and accumulated along the other dimensions. For example, when a received input is a three dimensional input, e.g., an RGB image with dimensions X and Y, the image may be described as having dimensions im(X,Y,3) and the kernel dimensions k($X_k$, $Y_k$, 3), leading to an output of $I_{mo}(X_o,Y_o,1)$, where $X_o$ and $Y_o$ depend on stride and edge handling conditions.

$$Im_o = \sum_i im_i * k_i$$

where i represents R, G or B. The "*" in the equation above represents a convolution operator and may be replaced with any operation that operates over a neighborhood of the original image that has the same spatial extent as the kernel. To perform this in the optical domain, the readout could be considered an integrator (since it is a photon counter). Therefore, the sequence could be: zero out readout, introduce each of $im_i$ and $k_i$ in sequence for a fixed time, then read out the $im_o$ from the readout sensor.

The convolutional neural network layer generates outputs from received inputs in accordance with current values of the parameters for the neural network layer by performing one or more convolutional computations, i.e., by convolving received inputs with each kernel in the corresponding set of kernels. For example, in cases where a received input is an image, e.g., input 108a, the convolutional neural network layer may perform a convolutional computation by adding each element of the image to its local neighbors, weighted by the kernel, e.g., kernel 108g. Each kernel generates a respective different set of outputs.

Continuing the example, if the image is represented by a 3 by 3 matrix, and the kernel is a 3 by 3 matrix, performing the convolutional computation may include flipping the rows and columns of the kernel, multiplying locationally similar entries, and summing. The generated output is an image, where each element of the image is a weighted combination of all the entries of the 3 by 3 matrix representing the input image, with weights given by the kernel. For example, the [2,2] element of the generated output may be given by $$[2,2]\left(\begin{pmatrix} a & b & c \\ d & e & f \\ g & h & i \end{pmatrix} * \begin{pmatrix} 1 & 2 & 3 \\ 4 & 5 & 6 \\ 7 & 8 & 9 \end{pmatrix}\right) = (i \times 1) + (h \times 2) +$$
$$(g \times 3) + (f \times 4) + (e \times 5) + (d \times 6) + (c \times 7) + (b \times 8) + (a \times 9)$$

Neural network architectures vary, and some may perform operations on a portion of an input that are different from standard convolution. For example, some layers generally considered to be convolutional neural network layers may actually perform correlation or a different set of matrix multiplication operations on a subset of input to a layer. The optical processing module may be used to perform any of these operations. For example, the optical processing module may be configured to perform convolution, correlation such as cross correlation, or other operations to replicate the operations of a neural network layer. In some implementations, the input, output, or filter used in the optical processing module may be adjusted so that the operations performed match those of a neural network layer. In some instances, different portions of an input are selected depending on which operation is to be performed. In other instances, the kernel or filter used may be adjusted. Similarly, the system may adjust a mapping of neural network layer outputs to the inputs to the optical processing module, or a mapping of optical processing module outputs back to inputs to another layer of the neural network, so that appropriate operations are performed. For example, the output of an optical correlator may be rotated, phase shifted, scaled, or otherwise manipulated.

In some implementations, the convolutional computations performed by the convolutional neural network layers may include n-dimensional convolutional computations. For example, each kernel in convolutional layer 108d has a depth that is equal to the number of data sheets in pooling layer 108c, i.e., six. The convolution therefore connects different data sheets in the pooling layer 108c.

As described above, performing convolutional computations in the digital domain can be costly. For example, under certain assumptions, the time complexity of an l-th convolutional neural network layer may scale as $O(n_{l-1} \cdot s_l^2 \cdot n_l \cdot m_l^2)$, where $n_l$ represents the depth of the layer l (e.g., the number of kernels in the layer l), $n_{l-1}$ represents a number of input channels to the l-th layer, i.e., the input depth, $s_l$ represents a spatial size of the kernel (e.g., the length of the kernel), and $m_l$ represents a spatial size, i.e., linear dimension, of the layer output. In some settings, for example layers with large kernel sizes, performing such convolutional computations in the digital domain can be inefficient or even intractable. In such cases, the electronic circuitry 106 of FIG. 1A is configured to outsource the convolutional neural network layer computations to components in the analog domain 104 of FIG. 1A.

Returning to FIG. 1A, the analog domain 104 includes an optical correlator module 110. The optical correlator module 110 is configured to operate in parallel with the electronic circuitry 106. For convenience, the optical correlator module 110 described in FIG. 1A (and FIG. 2A below) is described as being a device that operates on coherent light and compares two signals using the Fourier transforming property of a lens. However, in some implementations the optical correlator module may be a device that operates on incoherent light, e.g., as described below with reference to FIG. 2D.

The optical correlator module 110 includes one or more spatial filter devices 112. The one or more spatial filter devices 112 may be predefined, and data specifying the one or more spatial filter devices 112 may be stored optically or digitally for selection. The optical correlator module 110 is configured to multiply a received input signal, e.g., convolutional layer input data 114, by a respective spatial filter in the Fourier domain. Example optical correlator modules that operate on coherent light are described in more detail below with reference to FIGS. 2A-2C.

As described above, typically the Fourier transform of a convolution is equivalent to a pointwise product of individual Fourier transforms. Therefore, in cases where the optical correlator module operates on coherent light, as illustrated in FIG. 1A, the multiplication of a received input signal by a respective spatial filter in the Fourier domain may be equivalent to a convolution of the received input signal with the respective spatial filter (after leaving the Fourier domain using a second Fourier transform, e.g., an inverse Fourier transform together with an appropriate phase shift or other mathematical adjustment).

Each spatial filter device of the spatial filter devices 112 is defined by parameters of a respective convolutional neural network layer in the convolutional neural network 108. For example, as described below with reference to FIGS. 2-5, the elements of a kernel associated with a convolutional neural network layer may be mapped to respective transparency or intensity strengths of pixels in a respective spatial filter. In this manner, a second Fourier transform of the multiplication of the received input signal by a respective spatial filter in the Fourier domain performed by the optical correlator module 110 produces an output that may be equivalent to the convolutional computation performed by the convolutional neural network layer on the convolutional layer input using the kernel.

The optical correlator module 110 generates an optical correlator output, e.g., convolutional output data 116, by applying a second Fourier transform to the product of the received input signal and the one or more spatial filters in the Fourier domain.

In some case the generated optical correlator output, e.g., convolutional output data 116, may require post processing in order to retrieve a result corresponding to the convolutional computation performed by the convolutional neural network layer on the convolutional layer input using the kernel. For example, the generated optical correlator output may differ to the result corresponding to the convolutional computation by a sign or a phase since the optical correlator output may be a measured quantity that corresponds to a square of the electromagnetic field. In this example, the measured quantity may therefore correspond to a square amplitude of the result of the convolutional computation. This may mean that sign information is missing in the result of the convolutional computation—the result of the convolutional computation corresponds to a positive image and a positive kernel. In cases where the kernel and/or image are not positive, the system may pre-process received inputs to make the kernel and/or image positive, perform the convolutional computation using the processed inputs and post-process the result of the convolutional computation to retrieve an actual result of the convolutional computation.

Alternatively, in order to retrieve the actual result of the convolutional computation, the system may apply an image detection scheme that measures the electric field directly. As a further alternative, the optical correlator output may be obtained by measuring the amplitude and phase of the output separately. In some cases the separately measured quantities could be digitally combined at a later point in time. In addition, in some cases the system may retrieve an actual result of a convolutional computation by selecting a part of an optical correlator module output as the result of the convolutional computation. The system may determine when to select a part of the optical correlator module output and which part of the optical correlator module output based on the geometry of the optical correlator module and filter elements included in the optical correlator module. Selected parts of the optical correlator module output may be appropriately rescaled, rotated, have phase factors added or other mathematical operations performed on it to retrieve an actual result of the convolutional computation. The above described operations may be performed by a data conversion module, as described below with reference to FIG. 3.

The generated optical correlator output is provided back to the electronic circuitry 106 in the digital domain. For example, the convolutional neural network 108 may receive the generated optical correlator output and process the output using additional layers of the convolutional neural network to generate a convolutional neural network output. Generating a convolutional neural network output by processing a neural network input using a convolutional neural network 108 and an optical correlator module 110 is described in more detail below with reference to FIG. 3.

Figure 2A:
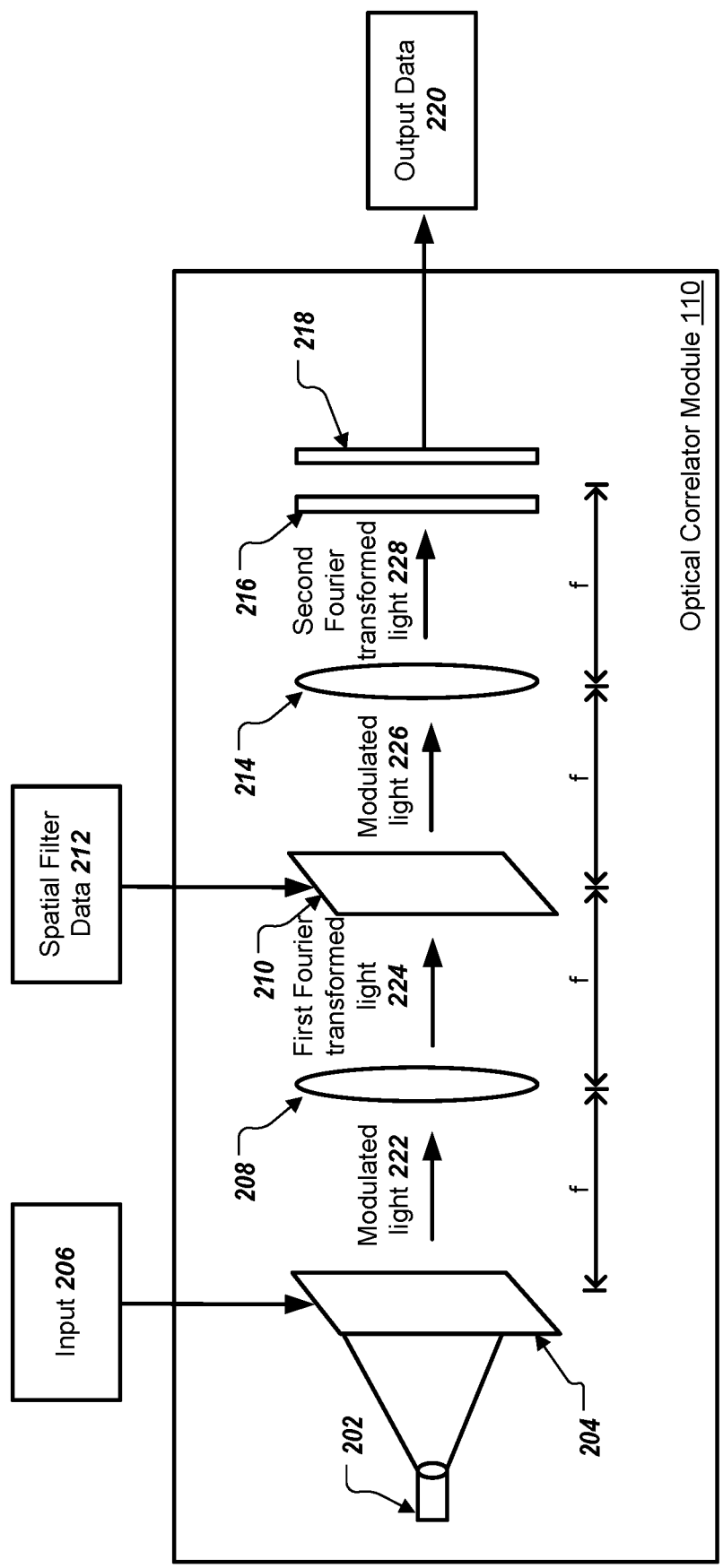
FIG. 2A depicts an example optical correlator module.

FIG. 2A depicts an example optical correlator module 110, as described above with reference to FIG. 1A. The example optical correlator module 110 includes a light source 202, a projector element 204, a first lens 208, a spatial filter device 210, a second lens 214, an imager element 218 and, optionally, a non-linear element 216. In some implementations the optical correlator module may include a different number of components. For example, the optical correlator module may include a single lens, or multiple lenses. For example, in some cases it may be beneficial to include multiple lenses to help shape a projected image, to collimate light, to include in the projector element, or to include near a detector to shape detected features. Alternate arrangements of optical correlator modules are described below with reference to FIGS. 2B-2D.

For convenience, the example optical correlator module 110 is arranged as a 4f correlator, i.e., the components of the optical correlator are a fixed focal length f from one another. However, in some implementations the components of the optical correlator may be alternatively arranged, e.g., as a joint transform correlator. In addition, for convenience the example optical correlator module 110 is depicted as including one optical channel, e.g., a monochrome channel. However, in some implementations the optical correlator module 110 may include multiple optical channels for different wavelengths of light. Using multiple wavelengths, the optical correlator module 110 can be configured to simultaneously process multiple inputs, one on each optical channel. For convenience, the optical correlators drawn in this specification are draw with inputs and generated outputs on-axis, however in some implementations the inputs and/or generated outputs may be off-axis.

The optical correlator module 110 is configured to receive an input signal 206. The input signal 206 can be a digital signal that specifies the properties of light to be propagated through the optical correlator module 110. For example, the input signal 206 can be image data for a two-dimensional image that was derived from input to a convolutional layer of neural network. The image can be displayed on the projector element 204, which may be illuminated by light emitted by the light source 202. The input signal 206 thus represents the input data set for a convolution operation. As the input data set for convolution changes, e.g., for each new propagation through a neural network, the input signal 206 changes accordingly to define a different image reflecting the new input data set.

As described above with reference to FIG. 1A, the optical correlator module 110 is configured to operate on coherent light. The light emitted by the light source 202 is therefore coherent light. For example, in some implementations the light source 202 may be a laser or an array of lasers. The light emitted by the light source 202 may be collimated light, or light directed in another controlled manner. Generally, the type of light source used is selected to be appropriate for the geometry of the optical correlator module. For example, as described below with reference to FIG. 2D, in cases where the optical correlator module is configured to operate on incoherent light, the light source may include one or more light-emitting diodes (LEDs) or other light sources together with guides, mirrors, lenses, or other structures that collimate, spread, or otherwise direct the light for further propagation through the optical correlator module.

In some implementations the projector element 204 may be a spatial light modulator (SLM) that imposes a spatially varying modulation on a beam of light. For example, the projector element 204 may be configured to modulate an intensity of a light beam provided by the projector 202. In other examples, the projector element 204 may be configured to modulate a phase of a light beam or both the intensity and the phase concurrently. For example, the SLM may include an array of microelectromechanical system (MEMS) shutters. In some implementations the MEMS shutters may not be binary. In some implementations the SLM may include liquid crystal (LC) or liquid crystal on silicon (LCOS) displays.

In some implementations, the light source 202 and projector element 204 can be combined into a single device or assembly.

The first lens 208 is configured transform the modulated beam of light 222 into the Fourier domain using the Fourier transforming property of a lens. For example, the first lens 208 may be a convex lens with focal length f, and as described above may be positioned at a distance f away from the projector element 204. The first lens may therefore produce a Fourier transform of the modulated light beam at a distance f behind the first lens f due to Fresnel diffraction. In some implementations the first lens 208 may be a diffractive lens. In other implementations the first lens 208 may be a refractive lens, e.g., spherical or achromat. The first lens 208 may be made from any number of different materials, such as glass, polymer or crystal. The first lens 208 may be programmable, e.g., in cases where it is a diffractive lens made from a controlled pixelated system. The first lens 208 may be configured to perform a full Fourier transform or to perform a transform that includes phase information only. In cases where the optical correlator module is arranged as a joint transform correlator, an output signal may be provided by the first lens 208 instead of a Fourier transform of an output signal.

The spatial filter device 210 is configured to be illuminated by the Fourier transform of the modulated beam of light 224. In some implementations the spatial filter device 210 may be a SLM that imposes a spatially varying modulation on a beam of light. For example, the spatial filter device 210 may be configured to modulate an intensity of a received light beam. In other examples, the spatial filter may be configured to modulate a phase of a light beam or both the intensity and the phase concurrently. For example, the SLM may include an array of Microelectromechanical system (MEMS) shutters. In some implementations the MEMS shutters may not be binary. In some implementations the SLM may include liquid crystal (LC) or liquid crystal on silicon (LCOS) displays. In some cases the spatial filter device 210 may be recorded using holographic or interferometric methods. For example, a reference signal or Fourier transform of a reference signal may be recorded using holographic or interferometric methods as in a Vander Lugt correlator.

The spatial filter device 210 is a variable or programmable spatial filter device. In other words, the filtering provided by the spatial filter device 210 may be varied according to received spatial filter data 212. As described above with reference to FIG. 1A, the spatial filter data 212 may include data representing parameters of convolutional neural network layers. For example, each convolutional neural network layer in a convolutional neural network may be associated with a respective set of kernels. The elements of each kernel may be used to define a respective spatial filter. For example, the elements of a kernel associated with a convolutional neural network layer may be mapped to respective transparency or intensity strengths of pixels in a respective spatial filter, with low-valued kernel elements being mapped to low-valued transparency or intensity strengths. In this example, data specifying the transparency or intensity strengths for the respective spatial filter may be stored as spatial filter data 212. The spatial filter data 212 may be pre-computed, e.g., computed based on trained convolutional neural network 108 parameters, and then stored in a data store.

Generating the spatial filter data 212 can include transforming parameters of a convolutional kernel for a convolutional neural network layer into a frequency-domain spatial filter. For example, each filter defined by spatial filter data 212 may include image data representing the results of applying a Fourier transform to weights or other parameters of a different convolution kernel. In some cases the weights or other parameters of the convolutional kernel may need to be scaled before a Fourier transform is applied, e.g., because the intensity of light cannot be negative and there is a limited dynamic range to light. In these cases digital values of bits, e.g., 16 bit digital values −32,768 to 32,768, may be mapped to an intensity range of 0% to 100%, with 50% representing the digital zero. In some cases, to limit signal clipping, statistics from sample data, e.g., training data used to train the neural network, or a non-linear function, e.g., a logarithmic function, may be used.

Generally, image data and/or convolutional kernel weights may be scaled using $$im_{optical} = (im_{input} + a_{im})/s_{im}$$

$$k_{optical} = (k_{trained} + a_k)/s_k$$

where $im_{optical}$ and $k_{optical}$ represent a scaled image and scaled convolutional kernel, respectively, $im_{input}$ and $k_{trained}$ represent the image and convolutional kernel provided from the neural network, $a_{im}$ and $a_k$ represent factors that ensure the scaled image and convolutional kernel are positive, and $s_{im}$ and $s_k$ represent scaling factors. For a particular element at (i,j) in the optical correlator module output, if the kernel has dimensions X by Y, a neighborhood X by Y of the image may be considered. The output element $conv_{optical}(i, j)$ may then be determined by $$conv_{optical}(i, j) = (1/(s_{im}s_k))\left(a_k \sum_{window} im_{input}(i, j) + im_{input}(i, j) * k_{trained}(i, j) + a_{im}\left(XYa_k + \sum k_{trained}\right)\right)$$

where $conv_{out}(i,j) = im_{input}(i,j) * k_{trained}(i,j)$, and $\Sigma_{window}$ represents the sum of elements within a window—a form of pooling operation. In the equation above, a convolution is represented, where * represents a convolution operator, and $conv_{out}(i,j)$ represents the local convolution output of the trained system and $conv_{optical}(i, j)$ represents the optical system operation. The same equation can be used to represent correlation and other linear operations, if the * operator is instead used to represent a correlation operator or other operator. The above equation can be solved to give $$conv_{out}(i, j) = s_{im}s_k conv_{optical}(i, j) - a_{im}\left(XYa_k + \sum k_{trained}\right) - a_k \sum_{window} im_{input}(i, j)$$

In some cases, the kernel may need to be mirrored or rotated around some subset of axes, for example if the original network is trained using a convolutional operator and the optical system uses correlation.

In cases where the optical correlator module is a non-coherent light optical correlator module, as described below with reference to FIG. 2D, generating spatial filter data may require additional and/or different processing to that described above.

When the optical correlator module 110 is used, e.g., as part of generating data for a prediction or evaluation using a neural network 108, the appropriate spatial filter data 212 can be selected dynamically. For example, the set of spatial filter data 212 corresponding to the appropriate neural network and the appropriate layer of the neural network can be accessed. From the spatial filter data 212, the data for a particular filter can be accessed and used to set the parameters of the spatial filter device 210. The optical correlator module 110 may also dynamically vary which filter from the spatial filter data 212 is used. For example, if the spatial filter data 212 defines ten different convolution kernels, the optical correlator module 110 may sequentially set the spatial filter device 210 to use each filter. In some implementations, the various filters can be applied while the parameters of the projector element 204 remain constant, in order to perform convolution with different kernels for the same input value.

When the optical correlator module 110 is used to perform a convolution, e.g., when an optical correlator module input 206 is received, corresponding spatial filter data 212 is written to the spatial filter device 210. In some implementations the optical correlator 110 may operate with a feedback loop, and previously generated output data may be used to write spatial filter data 212 to the spatial filter device 210. The spatial filter data 212 written to the spatial filter device 210 is dependent on the type of input 206. For example, as described above with reference to FIG. 1A, the optical correlator module 110 may be used to perform a convolutional computation for a convolutional neural network layer. In this example, the optical correlator input 206 may include an input signal corresponding to the convolutional neural network layer input, and the spatial filter data 212 may include data specifying a spatial filter representation of a convolutional neural network layer kernel.

The second lens 214 performs a second Fourier transform on the modulated beam of light 226. In some implementations the second lens 214 may be a diffractive lens. In other implementations the second lens 214 may be a refractive lens, e.g., spherical or achromat. The second lens 214 may be made from any number of different materials, such as glass, polymer or crystal. The second lens 214 may be programmable, e.g., in cases where it is a diffractive lens made from a controlled pixelated system. In some cases either or both of the first and second lens may include zoom lenses that can be used to select regions of a given image or to perform scaling operations on an image.

In some implementations the optical correlator module 110 may include fewer or more lenses. For example, the optical correlator module 110 may include only one lens, e.g., the first lens, to perform a Fourier transform. In other examples the optical correlator module 110 may include more than two lenses, e.g., used to create an input image and/or to process a generated optical correlator module 110 output. In some implementations cylindrical lenses may be used by the optical correlator module to perform a convolution computation in one spatial dimension. In other implementations separate lenses may be used by the optical correlator module 110 to perform convolutions in multiple spatial dimensions.

The second Fourier transformed modulated beam of light 228 is configured to pass to the imager element 218. Optionally, the second Fourier transformed modulated beam of light 228 may be configured to pass through a non-linear element, e.g., non-linear element 216, to the image element 218. In some implementations the non-linear element may be a saturable absorber that performs nonlinear absorption on a received signal. For example, the nonlinear element may include a photodiode that provides a nonlinear electrical response to an optical input. In some implementations a bulk semiconductor, quantum well or quantum dot photodiode may be constructed so that a bias may be applied that induces an electric field across the absorber that modifies the nonlinear behavior. This may be performed in a pixelated manner. For example, in cases where a quantum well is constructed, the quantum well barrier height may be modified with an electric field, thus changing its properties.

In some implementations the nonlinear element may include a nonlinear excitable media such as phosphors, quantum dots or quantum wells that have an optical output that responds nonlinearly to the optical input. In these implementations, a bandpass filter may be used to select a part of the optical output that is provided to the imager element 218. The bandpass filter may also be programmable with input from any other component of the optical correlator module 110, e.g., allowing for a non-linearity that is programmed by pixel (such as with an array of different quantum dots). For example, the bandpass filter could be LC-tunable by pixel.

For convenience, the non-linear element 216 is illustrated as being positioned directly before the imager element 218. However, in some implementations the non-linear element 216 may be placed in other positions. For example, the nonlinear element may be separate from the imager element 218 or nonlinear functions may be embedded in the imager element 218. In some implementations the optical correlator module may include multiple non-linear elements.

The imager element 218 is configured to generate an optical output. For example, in cases where the optical correlator module 110 receives image input data 206 and is configured to compare the received image data with spatial filter data 212, the optical output generated by the imager element 218 may include highly localized intensities, e.g., spots or peaks, indicating a match between the input image data 206 and spatial filter data 212. The intensity of the spots or peaks provides a measure of the similarity of the images being compared, whilst the position of the spots or peaks denotes how images are relatively aligned. In some implementations, e.g., when the optical correlator module is arranged as a matched filter, a cross correlation or convolution of an input image and the spatial filter device may be selected as an optical output.

In some implementations the imager element 218 may include a localized sensor that is focused on a specific area and configured to sense intensities, e.g., spots or peaks. In some implementations the imager element 218 may include a charge-coupled device. In some implementations the imager element 218 may include a complementary metal oxide semiconductor image sensor. In some implementations the imager element 218 may include a photodiode or an array of photodiodes.

The optical correlator module 110 is configured to provide output data 220 representing the optical output generated by the imager element 218. In some implementations the output data 220 may be provided as input to a second optical correlator module. For example, a second optical correlator module may be configured to receive output data 220 and perform a second convolutional computation on the output data 220. In some implementations multiple optical correlator modules may be stacked or cascaded and used to perform sequential convolutional computations on a given input. In further implementations, the optical correlator module 110 may perform closed-loop computations, that is the output data 220 may be used to generate a new input 206 for the optical correlator module 110. In these implementations, the spatial filter device 210 may be varied for each received input based on the output data 220.

As described above with reference to FIG. 1A, in some implementations the output data 220 may be provided back to a neural network, e.g., the convolutional neural network 108, for processing by one or more additional layers of the neural network to generate a convolutional neural network output. Generating a convolutional neural network output using an optical correlator module is described in more detail below with reference to FIG. 3.

Figure 2B:
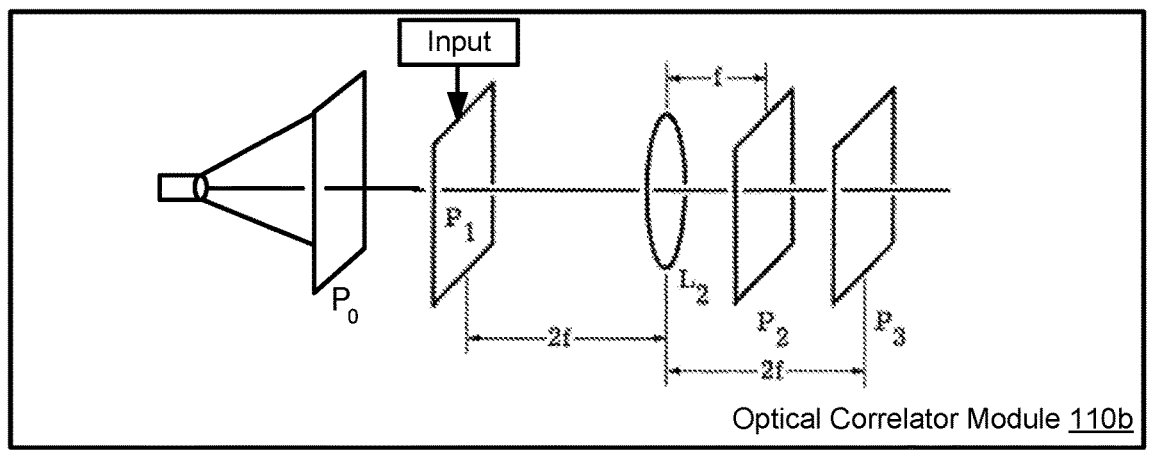
FIGS. 2B-2D depict alternative example optical correlator modules.
Figure 2C:
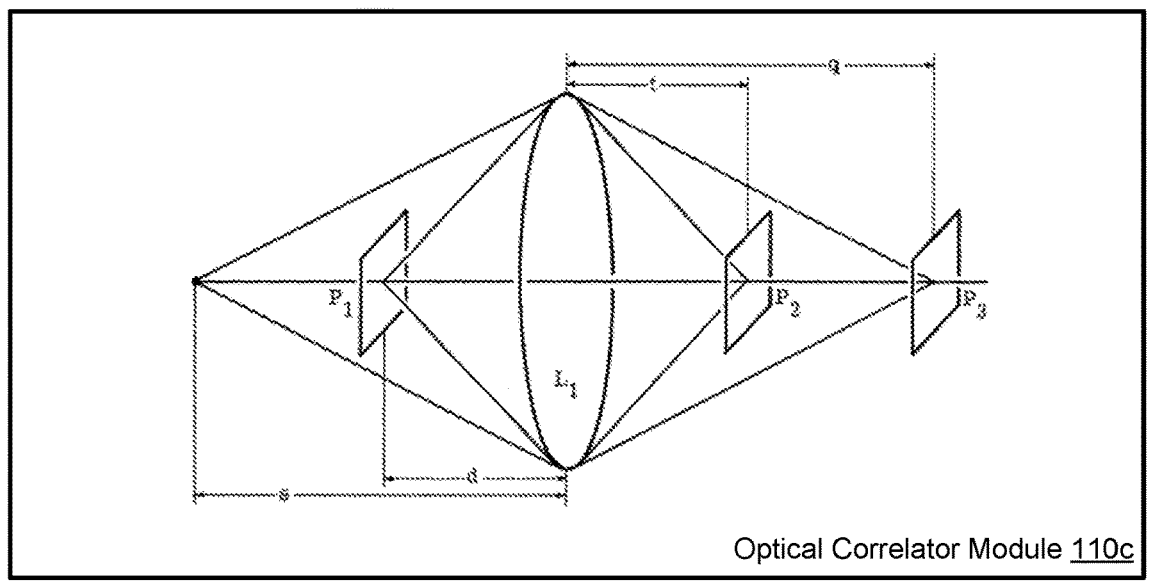

The example optical correlator module 110 described above is one of many possible optical correlator modules that may be included in the system 100 for performing convolutional computations using an optical correlator module. FIGS. 2B-2D depict alternative example optical correlator modules that may be included in the system 100. In some of the examples below, the detected intensities of electromagnetic field outputs generated by the optical correlator modules 110b-d may require post processing to obtain a convolutional output, as described above with reference to FIG. 2A. For example, a detected intensity of a generated output may include a square of a convolutional result, e.g., a square of the amplitude of the generated electromagnetic field, or a convolutional result that has been multiplied by a scaling factor that may be real or complex. In these cases the system 100 may be configured to post process detected intensities of generated optical correlator module outputs appropriately in order to obtain a convolutional output as described above.

FIG. 2B depicts an alternative optical correlator module 110b. The alternative optical correlator module 110b includes a light source an element $P_0$, e.g., a collimating lens, a projector element $P_1$, that creates an image using an input signal, as described above with reference to FIG. 2A, a lens $L_2$, a spatial filter device $P_2$, and an imager element $P_3$. The projector element $P_1$ is behind the element $P_0$ and at a distance 2f in front of the lens $L_2$. The spatial filter device $P_2$ is at a distance f behind the lens $L_2$. The imager element $P_3$ is a distance f behind the spatial filter device $P_2$. In this example, the lens $L_2$ is a transforming lens as well as an imaging lens. In some implementations the arrangement of the optical correlator module 110b may vary. For example, in some cases the optical correlator module 110b may include fewer or more filter elements, or fewer or more lenses.

FIG. 2C depicts a single-lens optical correlator module 110c which uses a diverging rather than collimated light source. The single-lens optical correlator module 110c includes a projector element $P_1$, a single lens $L_1$, a spatial filter device $P_2$, and an imager element $P_3$. The projector element $P_1$ is a distance d in front of the lens $L_1$. The spatial filter device $P_2$ is a distance t behind the lens $L_1$. The imager element $P_3$ is a distance q behind the lens $L_1$. The arrangement of the single-lens optical correlator module 110c is one of many examples. In some implementations the arrangement of the single lens optical correlator module 110c may vary. For example, in some cases the optical correlator module 110c may include fewer or more filter elements.

Figure 2D:
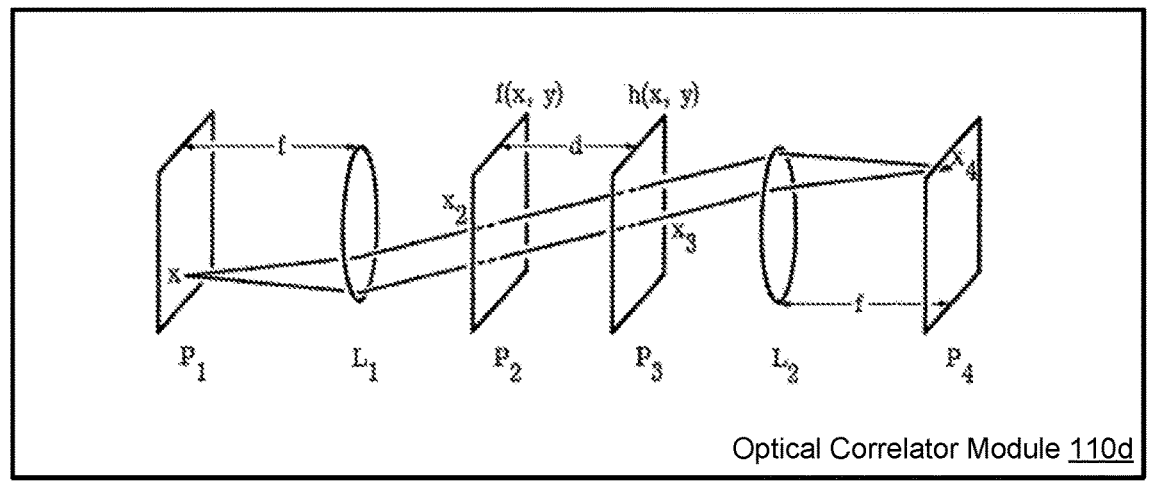

FIG. 2D depicts a non-coherent optical correlator module 110d. The non-coherent optical correlator module 110d includes a light source $P_1$. The light source may not be monochromatic. For example, the light source may include one or more light-emitting diodes (LEDs), e.g., an array of separately controlled LEDs, with each LED representing one pixel of an optical signal to be propagated by the optical correlator module 110d. The brightness or other parameters of the light output of each LED can be varied to represent a different input to the optical correlator module 110d.

The non-coherent optical correlator module 110d further includes a spatial filter device $P_2$ that creates an image. The spatial filter device $P_2$ may be a spatial filter device whose transparency may be represented by a function f(x,y) (e.g., an input image or input data). The non-coherent optical correlator module 110d further includes a second spatial filter device $P_3$. The second spatial filter device $P_3$ may be a spatial filter device with a reference function (e.g., kernel) represented by h(x,y). The non-coherent optical correlator module 110d further includes an imager element $P_4$. The spatial filter devices $P_2$ and $P_3$ are a distance d away from each other.

The optical correlator module 110d includes two lenses. A first lens $L_1$ is a focal length f from the extended source of diffuse illumination $P_1$. A second lens $L_2$ is a focal length f from the imager element $P_4$. In some implementations the optical correlator module 110d may include fewer lenses, or may include more lenses. In addition, in some implementations the optical correlator module 110d may be alternatively arranged. The lenses $L_1$ and $L_2$ may be used to direct light over the spatial filter devices $P_2$ and $P_3$ in a manner that performs a convolutional computation corresponding to the reference function (kernel) directly, taking advantage of how lenses can change the direction of light that passes through.

For convenience, the optical correlator modules 110b-d are illustrated without non-linear elements, however in some implementations the optical correlator modules 110b-d may include one or more non-linear elements.

Figure 3:
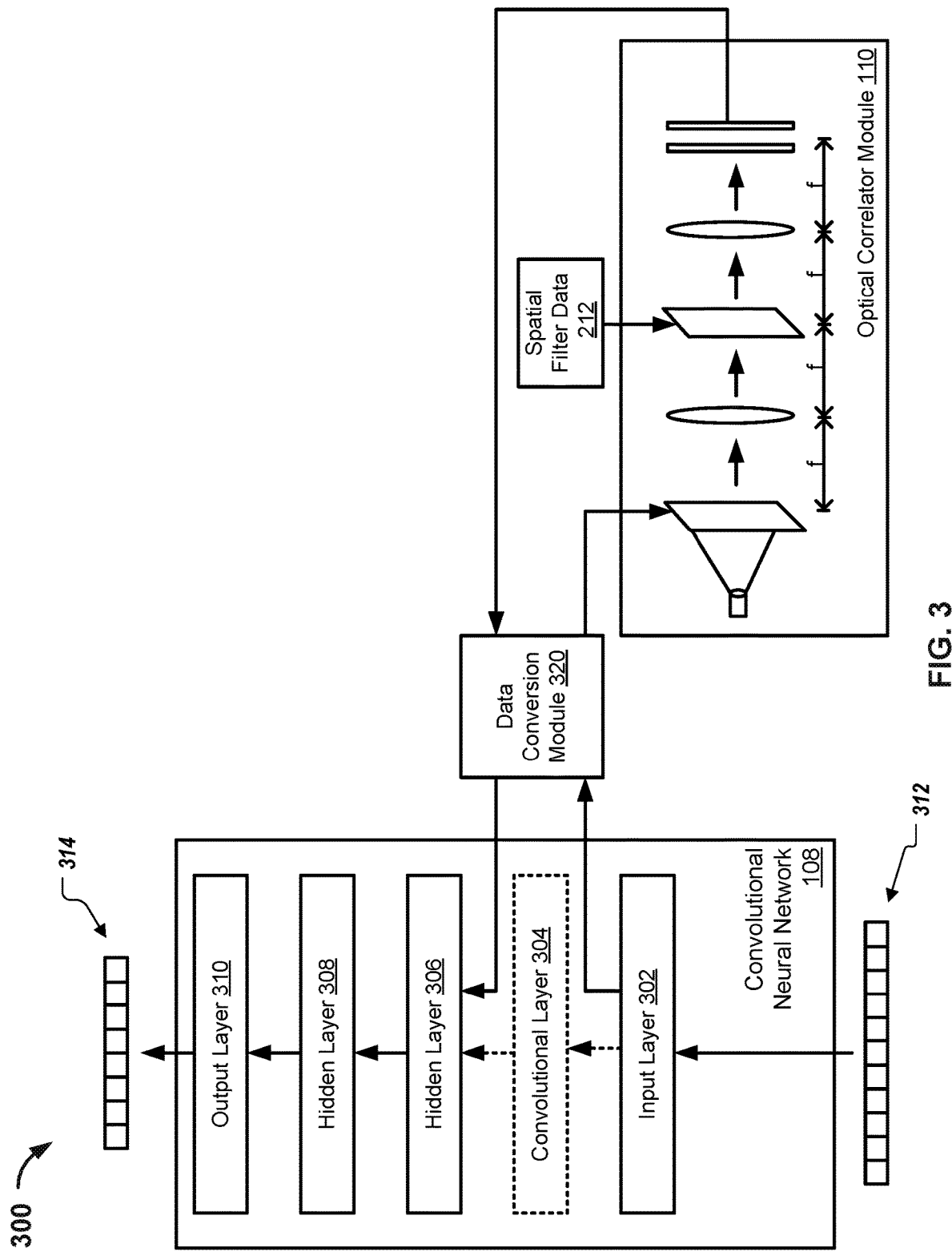
FIG. 3 depicts a conceptual block diagram of an example system for processing a neural network input using a convolutional neural network and an optical correlator module.

FIG. 3 depicts a conceptual block diagram of an example system for processing a neural network input using a convolutional neural network and an optical correlator module. The system 300 can be configured to receive as input a neural network input, e.g., neural network input 312, and to process the neural network input to generate a neural network output, e.g., neural network output 314. Generally, the system 300 can be implemented as a system of components with physical hardware like that described above with respect to FIGS. 1 and 2 above. The system 300 may include one or more computers that operate across one or more locations.

Briefly, the system 300 includes a convolutional neural network 108, data conversion module 320 and optical correlator module. For convenience, the optical correlator module is an optical correlator module that operates on coherent light, e.g., optical correlator module 110. The components of the system 300 can exchange communications over one or more networks, or can exchange communications in another way, such as over one or more wired or wireless connections. For example, the system may use direct wired connections between the components of the system 300 to achieve maximum processing speed. In some implementations the wired connections may be included in the components of the system 300.

The neural network input 312 may represent any type of neural network input, such as an image, video sample, or audio sample. For example, the neural network input 312 may include an array of numbers that represent an image, e.g., of a handwritten number. Each pixel of the image may be represented by a respective pixel intensity. In some implementations the pixel intensities may be scaled appropriately between 0 and 1. The neural network output 314 may represent any type of neural network output, such as an estimated classification of an image, video sample or audio sample. Continuing the example above, the neural network output 314 may include one or more values that indicate the value of the handwritten number in the received image. For example, the neural network output 314 may include ten values corresponding to the numbers 1-10. A highest output value of the ten values may be used to classify the handwritten number in the image as a number corresponding to the highest output value.

The neural network input 312 may be provided to the convolutional neural network 108 for processing. For example, as illustrated in FIG. 3, the convolutional neural network 108 may include an input layer 302 that is configured to receive the neural network input 312. The input layer 302 may include multiple input neurons. The neural network input 312 may be encoded into the multiple input neurons. For example, in cases where the neural network input 312 is an image, the intensities of each pixel of the image may be encoded into the input neurons.

The convolutional neural network 108 may include multiple neural network layers. For example, the convolutional neural network 108 may include one or more convolutional neural network layers, e.g., convolutional layer 304, one or more other hidden neural network layers, e.g., hidden layers 306 and 308, and an output layer, e.g., output layer 310. Each neural network layer is configured to perform respective neural network computations in accordance with trained neural network layer parameters. For example, each convolutional layer may be configured to perform one or more convolutional computations on a received layer input in accordance with trained convolutional layer parameters. For convenience, the convolutional neural network 108 illustrated in FIG. 3 includes five neural network layers. However, in some implementations, the convolutional neural network 108 may include fewer or more layers. Similarly, for convenience, the convolutional neural network 108 illustrated in FIG. 3 includes a convolutional layer 304 followed by two hidden layers 306 and 308. However, in some implementations the ordering of the neural network layers may vary.

In some implementations the convolutional neural network 108 may include one or more pooling layers. For example, a pooling layer may follow each convolutional layer, e.g., hidden layer 306 may be a pooling layer. Pooling layers may be used to simplify or condense information in an output from a convolutional layer, i.e., a pooling layer may receive multiple feature maps from a convolutional layer and process the multiple feature maps to generate multiple respective condensed feature maps. The pooling layers may include max-pooling layers or $L_2$ pooling layers.

When processing the neural network input 312, the system may be configured to obtain a convolutional layer input, e.g., a neural network input for convolutional layer 304. For example, the convolutional layer input may include a layer output from a preceding layer in the neural network 108, e.g., an output from input layer 302. In some implementations the obtained convolutional layer input may correspond to a layer input for a first convolutional layer in the neural network, e.g., as illustrated in FIG. 3. In other implementations the obtained convolutional layer input may correspond to a layer input for a later convolutional layer in the neural network, e.g., a second, third, etc. layer.

In some implementations, the convolutional computations corresponding to the convolutional neural network layers included in the neural network may be performed both digitally and optically. For example, for some convolutional neural network layers, e.g., those associated with convolutional kernels that are small and/or whose respective layer inputs are small, the neural network may efficiently perform corresponding convolutional computations for the convolutional layers by processing a received neural network input digitally through the one or more convolutional layers. On the other hand, for other convolutional neural network layers, e.g., those associated with convolutional kernels that are large and/or whose respective layer inputs are large, the neural network may use one or more optical correlator modules to perform the corresponding convolutional computations. Similarly, in some instances, an optical system may provide greater speed while a digital system may operate with greater accuracy or precision. Thus, a system may switch between digital and optical convolution processing to adjust the tradeoff of speed and precision.

The system may be configured to provide the obtained convolutional layer input to the data conversion module 320. The data conversion module may be configured to convert received data into alternative formats for further processing. For example, the data conversion module 320 may be configured to receive a convolutional layer input and to convert the received data into an alternative format suitable for processing in an analog domain using the optical correlator module 110. For example, the data conversion module 320 may be configured to map a received digital vector to a two-dimensional array whose entries correspond to the pixels of a projector element in the optical correlator, e.g., projector element 204 of FIG. 2A.

Mapping a received input may include assigning entries of the digital vector to define respective pixels in the two-dimensional image. The assignment may be pre-determined, such that the mapped input matches the projector element, e.g., in terms of image size. In some implementations the arrangement of the converted input may depend on the type of data being modeled. For example, image data may have an x axis—y axis two-dimensional arrangement, and audio or other data may have a time—features two dimensional arrangement where the set of features are stacked (e.g., top row is features for time=0, next row is features for time=2, etc.) In each example, each value in the received digital vector may be converted by the data conversion module 320 into a respective light parameter, e.g., intensity or brightness, for a respective pixel of the projector element. In some implementations mapping received convolutional layer input data to an alternative format may further include normalizing, binning, or performing other operations on the received data.

The system may be configured to provide data representing a converted convolutional layer input to the optical correlator module 110. For example, as described above with reference to FIG. 2A, the converted data may be written to a component of the optical correlator modulator, e.g., to the projector element 204. The converted data may be written in such a manner that the dimensions and data written to the spatial filter device, e.g., spatial filter device 210 of FIG. 2A, matches an input received by the spatial filter device. The optical correlator module may be configured to perform a convolutional computation on the received data in an analog domain to generate a convolutional optical correlator module output. The convolutional computation is a computation that corresponds to the computation performed by the convolutional layer that is configured to receive the obtained convolutional layer input. For example, the convolutional computation performed by the optical correlator module 110 of FIG. 3 corresponds to a convolutional computation that may be performed by the convolutional layer 304 on a convolutional layer input.

As described above with reference to FIG. 2A, the optical correlator module may process the received input and perform a convolutional computation by transforming the received input data into an optical correlator input signal and performing a Fourier transform on the optical correlator input signal. The convolutional computation may then be performed using a spatial filter defined by a kernel associated with the convolutional layer that is configured to receive the obtained convolutional layer input. For example, the system may be configured to select spatial filter data 212 from a spatial filter data store based on the received convolutional layer input. The spatial filter data 212 includes data that has been pre-computed based on trained neural network parameters. In some implementations the system may be configured to select appropriate spatial filter data 212 in real time, e.g., in response to receiving convolutional layer input data. In other implementations the system may be pre-configured and the spatial filter data 212 may already be written to a spatial filter in the optical correlator module 110. The optical correlator module 110 may then perform a second Fourier transform on an output from the spatial filter, and, optionally, use a nonlinear element and an imager element to generate an optical correlator convolutional output. For example, the convolutional output generated by the optical correlator module may include an image showing highly localized intensities.

As described above with reference to FIG. 2A, in some implementations the optical correlator module 110 may be configured to perform pooling on a generated convolutional output, e.g., using the nonlinear element 216 or imager element 218. Such pooling operations may be used to replace computations performed by a pooling layer in the neural network 108.

The system may be configured to provide data representing the generated convolutional output to the data conversion module 320. As described above, the data conversion module 320 may be configured to convert received data into alternative formats for further processing. For example, the data conversion module 320 may be configured to receive a convolutional output and to convert the received data into an alternative format suitable for processing in a digital domain using the neural network 108. For example, in the case where the received convolutional output includes data representing an image, the data conversion module 320 may be configured to map the data representing the image into a one or two dimensional array of numbers.

As described above, in some implementations mapping received convolutional output data to an alternative format may include normalizing, binning, or performing other operations on the received data. For example, the data conversion module 302 may perform post processing of a received convolutional output data to generate a pooled convolutional output. Such post processing may be used to replace computations performed by a pooling layer in the neural network 108.

In addition, as described above with reference to FIG. 1, in some case the data representing the generated convolutional output may require post processing in order to retrieve a result corresponding to the convolutional computation performed by the convolutional neural network layer on the convolutional layer input using the kernel. For example, the output may differ to the result corresponding to the convolutional computation, e.g., by a sign or a phase. In addition, the optical correlator output is generally a measure quantity that corresponds to a square of the amplitude of the field—the measured output may therefore correspond to a square amplitude of the result of the convolutional computation. In order to retrieve the actual result of the convolutional computation, the optical correlator module may be configured to apply an image detection scheme that measures the electromagnetic field directly. Alternatively, the optical correlator output may be obtained by measuring the amplitude and phase of the output separately. In some cases the separately measured quantities could be digitally combined by the data conversion module 320 at a later point in time.

The system may be configured to process data received from the data conversion module 320 through additional layers of the neural network 108. For example, as illustrated in FIG. 3, the system may provide data received from the data conversion module 320 to a layer that follows the convolutional layer (whose respective layer input was originally provided to the optical correlator module 110), e.g., hidden layer 306. Alternatively, the system may provide data received from the data conversion module 320 to a subsequent layer of the neural network. For example, in cases where the convolutional neural network 108 includes a pooling layer after the convolutional layer 304 but the optical correlator module 110 or data conversion module 320 is configured to perform pooling operations that correspond to the operations performed by the pooling layer, the system may provide the data received from the data conversion module 320 to a neural network layer following the pooling layer.

The neural network layer that receives the data from the data conversion module 320 as input may process the received input and provide a respective output to a following layer in the neural network. This process may be repeated until a neural network output, e.g., neural network output 314, is generated. For example, as illustrated in FIG. 3, the hidden layer 306 may process the received input and provide a respective output to hidden layer 308, which in turn is configured to provide a respective output to the output layer 310.

For convenience, the above process for processing a neural network input using a convolutional neural network 108 and an optical correlator module 110 has been described in the context of performing a single convolutional computation, e.g., for a convolutional layer 304 with one convolutional kernel. In some implementations the convolutional layer 304 may include multiple kernels, e.g., corresponding to multiple respective feature maps. In these implementations the optical correlator module may be configured to perform multiple convolutional operations corresponding to each of the multiple kernels. For example, the convolutional layer input received by the data conversion module 320 may include multiple sub-inputs, e.g., each corresponding to one of the multiple feature maps. The optical correlator module 110 may then be configured to perform multiple convolutional computations to generate multiple convolutional outputs, e.g., corresponding to the multiple feature maps. For each convolutional computation, the optical correlator module 110 may write spatial filter data 212 to a spatial filter, e.g., spatial filter device 210 of FIG. 2A, corresponding to the respective kernel. The generated convolutional outputs may then be provided to the data conversion module 320, and data based on the generated convolutional outputs may be processed using additional layers of the convolutional neural network 108 as described above.

In addition, for convenience the above process for processing a neural network input using a convolutional neural network 108 and an optical correlator module 110 has been described as being performed by a system that includes a single optical correlator module 110. In some implementations the system 300 may include multiple optical correlator modules. For example, the system 300 may use optical correlator modules to perform multiple convolutional computations corresponding to a single convolutional layer, as described above. In addition, the system 300 may use multiple optical correlator modules to perform multiple convolutional computations corresponding to multiple convolutional neural network layers. In some implementations, for example those where the convolutional neural network 108 includes multiple successive convolutional neural network layers—optionally separated by pooling layers, fully connected layers or any other topology—multiple optical correlators may be stacked such that an output of one optical correlator is provided as input to another optical correlator. Furthermore, in some implementations, a single optical correlator may be operated closed-loop so that successive convolutional computations, e.g., corresponding to successive convolutional layers, are performed sequentially. Operating a single optical correlator in this manner may include writing different respective spatial filter data to the spatial filter for each convolutional computation.

Figure 4:
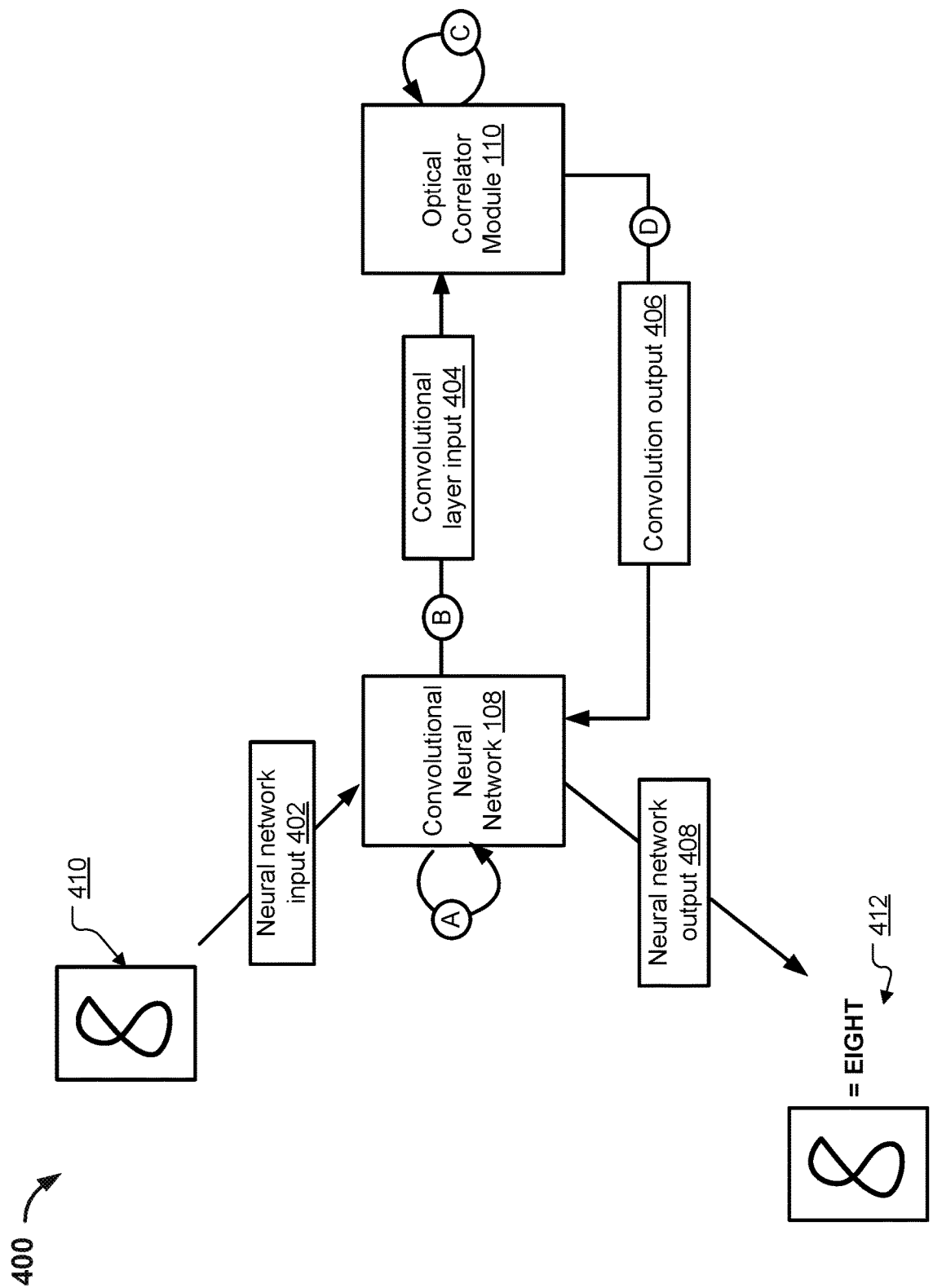
FIG. 4 depicts a conceptual block diagram of an example system for performing a convolutional computation.

FIG. 4 depicts a conceptual block diagram of an example system 400 for performing a convolutional computation. The system 400 can be configured to receive as input a neural network input, e.g., neural network input 402, and to process the neural network input to generate a neural network output, e.g., neural network output 412. Generally, the system 400 can be implemented as a system of components with physical hardware like that described above with respect to FIGS. 1, 2 and 3 above. The system 400 may include one or more computers that operate across one or more locations. Briefly, the system 400 includes a convolutional neural network 108 and optical correlator module 110, as described in detail above with reference to FIGS. 2 and 3. The components of the system 400 can exchange communications over one or more networks, or can exchange communications in another way, such as over one or more wired or wireless connections.

During stage (A), the convolutional neural network 108 performs computations for the convolutional neural network 108. For example, the convolutional neural network 108 may receive a neural network input 402. The convolutional neural network 108 may process the neural network input 402 through one or more neural network layers, as described above with reference to FIG. 3. Example neural network inputs 402 include but are not limited to images, video samples or audio samples. For example, as illustrated in FIG. 4, the neural network input 402 may be an image of a handwritten number. In this example, the convolutional neural network 108 may have been trained on training data to classify images as representing the numbers 1-10. In other examples the convolutional neural network 108 may have been trained on training data to perform other classification or recognition tasks. As described above with reference to FIG. 3, trained neural network parameters may be used to determine spatial filter data 212.

During stage (B), input data for a convolutional layer of the convolutional neural network 108 is obtained. The obtained input data for the convolutional layer of the convolutional neural network 108, e.g., convolutional layer input 404, is provided to the optical correlator module 110.

During stage (C), the optical correlator module 110 performs a convolutional computation on the convolutional layer input. The convolutional computation performed by the optical correlator module 110 is equivalent to a computation performed by the convolutional layer on the input data for the convolutional layer. For example, the optical correlator module may access predetermined spatial filter data that corresponds to a respective kernel of the convolutional layer. The spatial filter data may be written to a spatial filter of the optical correlator module 110 and used to perform the convolution computation on the convolutional layer input.

During stage (D), the convolutional neural network 108 receives a convolutional output 406 from the optical correlator module 110 and processes data through additional layers of the neural network. For example, as described above with reference to FIG. 3, the convolutional neural network 108 may receive the convolutional output 406 and provide the received convolutional output 406 as input to a neural network layer that follows the convolutional layer. The convolutional output 406 may be processed by the additional layers of the convolutional neural network 108 to generate a neural network output 408. The type of output generated by the convolutional neural network 108 is dependent on the input received by the neural network and the task the convolutional neural network 108 has been trained to perform. For example, as illustrated in FIG. 4, the convolutional neural network 108 may be trained to classify received images of handwritten numbers. In this example, the neural network input 402 may include an image 410 of a handwritten number, e.g., the number 8, and the generated neural network output may include an indication that the image 410 shows the number eight. As described above with reference to FIG. 3, trained neural network parameters may be used to determine spatial filter data 212.

Figure 5:
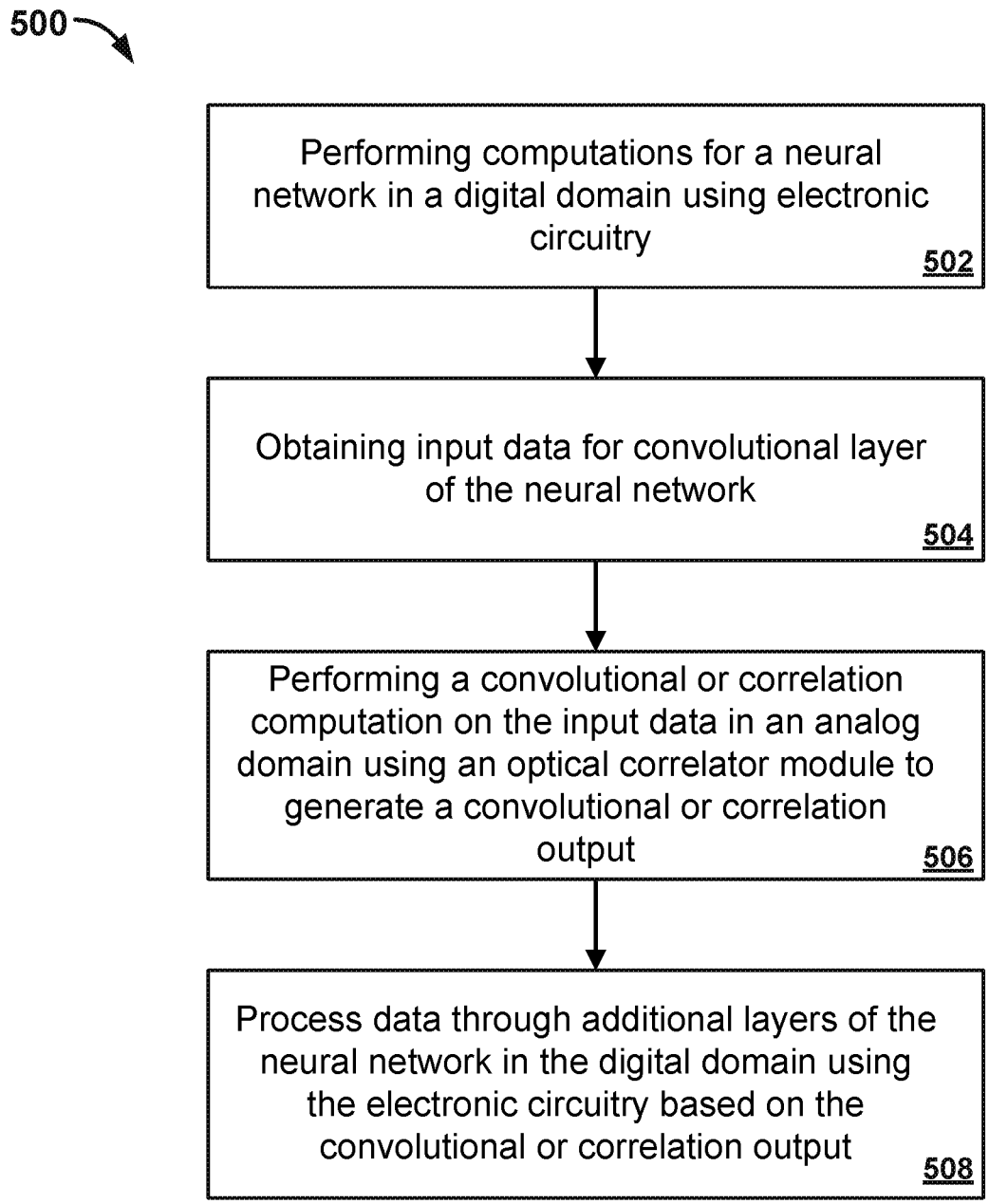
FIG. 5 is a flowchart of an example process for performing a convolutional computation using an optical correlator module.

FIG. 5 is a flowchart of an example process 500 for performing a convolutional computation using an optical correlator module. For convenience, the process 500 will be described as being performed by a system that operates over an analog domain and a digital domain. For example, a system for performing convolutional computations using an optical correlator module, e.g., system 100 including electronic circuitry 106 and optical correlator module 110 of FIG. 1A, appropriately programmed, can perform the process 500.

The system performs computations for a neural network in a digital domain using electronic circuitry (step 502). For example, in some implementations the neural network may include multiple neural network layers, as illustrated above in FIG. 3. In these implementations, the system may receive a neural network input and process the neural network through one or more of the multiple neural network layers. Each neural network layer is configured to process a received layer input according to a set of neural network layer parameters for the neural network layer.

The neural network includes at least one convolutional neural network layer. The convolutional neural network layer is configured to process a received convolutional neural network layer input according to a set of convolutional neural network layer parameters. The set of convolutional neural network layer parameters includes one or more convolutional neural network layer kernels. The convolutional neural network layer kernels may be represented as two-dimensional arrays, e.g., matrices. When processing a convolutional neural network layer input the convolutional neural network layer performs one or more respective convolution computations by convolving each kernel for the convolutional neural network layer with the convolutional neural network layer input.

The system obtains input data for the convolutional layer of the neural network (step 504). The input data for the convolutional layer of the neural network may include output data from a neural network layer preceding the convolutional layer. For example, as illustrated in FIG. 3, the input data for the convolutional layer of the neural network may include output data generated by the input layer 302.

The system performs a convolutional computation on the input data in an analog domain using an optical correlator module to generate a convolutional output (step 506). The optical correlator module is configured to operate in parallel with the electronic circuitry.

As described above with reference to FIG. 2A, the optical correlator may operate on coherent light and may include a projector element, a first lens, one or more spatial filter devices, a second lens, an imager element and a non-linear element. The projector element may be configured to transform a received optical correlator input signal into light, or to display a received optical correlator input signal. The first lens may be configured to perform a Fourier transform on a received input signal, e.g., a transformed optical correlator input signal. The one or more spatial filter devices are configured to modulate a received input signal, e.g., a Fourier transformed optical correlator input signal. Each of the one or more convolutional neural network layer kernels may define a respective spatial filter device, or may define a respective configuration of a same spatial filter device. For example, the elements of a kernel may be used to define respective intensity strengths or transparencies of the elements of one or more spatial filter devices. The second lens is configured to perform a second Fourier transform on a received input signal, e.g., a Fourier transformed optical correlator input signal that has been modulated by the spatial filter. The imager element is configured to generate an optical correlator output signal based on a received input signal, e.g., a Fourier transform of the Fourier transformed optical correlator input signal that has been modulated by the spatial filter.

Alternatively, as described above with reference to FIG. 2D, the optical correlator may operate on incoherent light and may include one or more lenses to direct light over spatial filter devices in a way that performs convolutional computations directly (without entering the Fourier domain).

In some implementations, the system performs a convolution computation on the input data in the analog domain using the optical correlator module by generating an optical correlator input signal based on the received input data, e.g., using the data conversion module 320 described above with reference to FIG. 3. The system may then process the generated optical correlator input signal using the optical correlator. In cases where the optical correlator module is configured to operate on coherent light, processing the generated optical correlator input signal using the optical correlator may include multiplying (i) a spatial filter device defined by a respective kernel for the convolution computation, with (ii) the generated optical correlator input signal in the Fourier domain, and performing a second Fourier transform on the multiplied spatial filter device and optical correlator input signal in the Fourier domain. The second Fourier transform may include an inverse Fourier transform, together with an appropriate phase shift or other mathematical adjustment. In cases where the optical correlator module is configured to operate on incoherent light, processing the generated optical correlator input signal using the optical correlator may include directly performing the convolutional computation.

In some implementations the system may perform pixel binning on a generated convolutional output. For example, in some implementations the neural network may include a pooling layer that is configured to receive and resize an output from the convolutional layer using a respective pooling filter. In these implementations the pooling may be performed in the analog domain using the optical correlator module instead of in the digital domain using the pooling layer. For example, the optical correlator module may be configured to perform pixel binning on a generated convolutional output, where the pooling filter of the pooling layer defines the pixel binning. In some implementations, the imager element or nonlinear element may be configured to perform the pixel binning. Alternatively or in addition, the system may perform post processing of a generated convolutional output to implement pixel binning.

In some implementations the system performs multiple convolution computations on the input data in the analog domain using the optical correlator module. For example, as described above with reference to step 502, the convolutional neural network layer may be configured to process a received convolutional neural network layer input using multiple convolutional neural network kernels. In these examples, the system may repeatedly use the optical correlator module to perform convolutional computations for each of the multiple kernels. This may include, in cases where the optical correlator module is configured to operate on coherent light, for each of the multiple spatial filter devices defined by respective kernels for the multiple convolution computations, multiplying (i) the spatial filter device, with (ii) the generated optical correlator input signal in the Fourier domain, and performing a second Fourier transformation on the multiplied spatial filter device and generated optical correlator input signal in the Fourier domain to generate a respective optical correlator output signal. In some implementations the system may vary the spatial filter device at discrete time intervals. In cases where the optical correlator module is configured to operate on incoherent light, directly performing multiple convolutional computations for each of the multiple spatial filter devices defined by respective kernels.

As another example, the system may use multiple optical correlator modules to perform convolutional computations on the input data for each of the multiple kernels. For example, in some implementations the system may include a number of optical correlator modules that is equal to the number of kernels used by the convolutional neural network layer. Alternatively, the system may include a number of optical correlator modules that is smaller than the number of kernels used by the convolutional neural network layer. Each optical correlator module may then be configured to perform one or more convolutional computations for one or more respective kernels.

As another example, as described above with reference to step 502, the neural network may include multiple convolutional neural network layers, e.g., multiple sequential convolutional neural network layers. In these examples, the system may repeatedly use the optical correlator module to perform convolutional computations for each of the convolutional neural network layers. For example, the system may perform a first convolution corresponding to a first convolutional layer on the input data using the optical correlator module to generate a respective first convolutional output. The system may then sequentially perform subsequent convolutions corresponding to subsequent convolutional layers on subsequent convolutional inputs using the optical correlator module to generate a final convolutional output. For example, the system may operate the optical correlator module as a closed loop, where each convolutional output generated by the optical correlator module is provided as input to the optical correlator module. In some implementations performing multiple convolutional computations corresponding to multiple convolutional neural network layers may include performing multiple convolutional computations for each respective convolutional neural network layer, e.g., if each convolutional neural network layer includes multiple kernels.

As a further example, the system may use multiple optical correlators to perform convolutional computations for each of the convolutional neural network layers. For example, the system may include multiple optical correlators that are stacked such that each generated optical correlator output is provided as input to a next optical correlator, with a final optical correlator generating a final convolutional output. The system may then perform multiple convolutional computations corresponding to multiple convolutional neural network layers by processing a first convolutional neural network layer input through the system of stacked optical correlator modules. In some implementations the stacked optical correlators may be configured to implement pixel binning on generated convolutional outputs, as described above. In some implementations performing multiple convolutional computations corresponding to multiple convolutional neural network layers using multiple optical correlator modules may include performing multiple convolutional computations for each respective convolutional neural network layer, e.g., if each convolutional neural network layer includes multiple kernels.

Based on the convolutional output, the system processes data through additional layers of the neural network in the digital domain using the electronic circuitry (step 508). In some implementations processing data through additional layers of the neural network may include providing the generated convolutional output as input to the additional layers of the neural network, e.g., to a neural network layer that follows the convolutional neural network layer, as illustrated in FIG. 3 above. The system may then process the generated convolutional output and subsequent additional layer outputs using the additional layers to generate a neural network output.

In some implementations the system may be trained to perform a machine learning task entirely in the digital domain. For example, the neural network may be trained to perform the machine learning task without using the optical correlator module. After training has finished, when processing a received neural network input during inference, the optical correlator module may then be substituted in for one or more neural network layers to perform convolutional computations and to accelerate processing when using the trained system to perform the machine learning task. In these implementations, the neural network parameters may be trained using a corresponding corpus of training data and by applying conventional backpropagation techniques. This type of training may include supervised training, semi-supervised training or unsupervised training techniques. As described above with reference to FIG. 3, the trained neural network parameters may be used to determine spatial filter data 212 that may be written to the spatial filter, e.g., when using the system to perform the machine learning task.

In some implementations the system may be trained to perform a machine learning task where the training process updates parameters in both in the digital and optical domains. For example, the combination of the neural network and the optical correlator module may be used together during training, rather than simply deriving optical correlator module parameters from previously trained neural network parameters. In other words, as training examples are propagated through the neural network and used to update the parameters of the neural network, the data propagation passes data through the optical correlator module and is used to incrementally adjust the values that define the spatial filter for the optical correlator module. Thus, training may vary both the parameters of the digital neural network elements and the parameters of the optical correlator module concurrently. Use of the optical correlator module to perform a task, e.g., inference, uses the same configuration of the network used during training. In these implementations, the neural network parameters may be trained using a corresponding corpus of training data and by applying backpropagation techniques. For example, the neural network may be configured to process training data inputs using the optical correlator module, as described above with reference to steps 502-508. The system may then apply backpropagation techniques through the layers of the neural network to determine trained neural network parameters.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A method comprising:
    receiving, using electronic circuitry, an input vector for a neural network in a digital domain, wherein the neural network includes parameters determined through neural network training of a convolutional neural network layer and one or more additional neural network layers;
    determining, based on the input vector or based on output generated by a layer of the neural network in response to the neural network receiving the input vector, convolutional layer input data for the convolutional neural network layer of the neural network in the digital domain;
    converting the convolutional layer input data for the convolutional neural network layer of the neural network in the digital domain into an alternative format that is suitable for processing by an optical correlator module that is configured to perform a convolution or correlation computation in an analog domain that is equivalent to a computation performed by the convolutional layer in the digital domain;
    inputting the converted, convolutional layer input data to the optical correlator module that is configured to perform the convolution or correlation computation in the analog domain instead of inputting the convolutional layer input data to the convolutional neural network layer of the neural network in the digital domain, wherein the optical correlator module comprises a programmable spatial filter, wherein the convolution or correlation computation is performed with the programmable spatial filter being programmed using spatial filter data determined based on parameters determined for the convolutional neural network layer through neural network training, and wherein processing performed by the optical correlator module in the analog domain includes performing pixel binning using the optical correlator module;

generating a digital representation of results of the convolution or correlation computation that are output by the optical correlator module; and providing the digital representation of the results of the convolution or correlation computation as input to the one or more additional neural network layers of the neural network for processing in the digital domain, the digital representation being processed using the one or more additional neural network layers of the neural network using the electronic circuitry.

2. The method of claim 1, wherein the optical correlator module operates in parallel with the electronic circuitry.

3. The method of claim 1, wherein:
the optical correlator module comprises one or more programmable filter devices;
the convolutional neural network layer comprises parameters that specify one or more convolution kernels for the convolutional neural network layer; and
performing the convolution or correlation operation comprises setting parameters of the one or more programmable filter devices to provide a filter corresponding to the one or more convolution kernels for the convolutional neural network layer.

4. The method of claim 3, wherein setting parameters of the one or more programmable filter devices to provide a filter corresponding to the one or more convolution kernels for the convolutional neural network layer comprises scaling (i) the parameters that specify the one or more convolution kernels for the convolutional neural network layer, and
wherein performing the convolution or correlation computation further comprises scaling an output from the optical correlator module to generate the optical correlator module output.

5. The method of claim 3, wherein the optical correlator module further comprises:
a projector element configured to transform coherent light according to a received optical correlator input signal;
a first lens configured to perform a Fourier transform on light transmitted by the projector element, wherein light passing through the first lens is directed to the one or more programmable filter devices; and
an imager element configured to detect light and to generate an optical correlator output signal based on the detected light.

6. The method of claim 5, wherein the optical correlator module further comprises a second lens configured to perform a Fourier transform on light that passes through the one or more programmable filter devices, and
wherein the imager element is configured to detect light passing through the second lens.

7. The method of claim 5, wherein the optical correlator module further comprises a non-linear element.

8. The method of claim 7, wherein the non-linear element is configured to perform pooling operations on information generated by the optical correlator module.

9. The method of claim 5, wherein performing the convolution or correlation computation in the analog domain comprises:
multiplying a programmable filter, defined by a respective kernel for the convolution or correlation computation, with the converted, convolutional layer input data in the Fourier domain; and
performing a second Fourier transform on the result of multiplying the programmable filter and the converted, convolutional layer input data in the Fourier domain.

10. The method of claim 1, wherein
the neural network comprises a pooling layer configured to receive and resize an output from the convolutional neural network layer using a pooling filter,
the optical correlator module is configured to perform pixel binning on a generated optical correlator module signal, and
the pixel binning performed on the generated optical correlator module signal is based on the pooling filter of the neural network.

11. The method of claim 1, wherein the optical correlator module further comprises:
a lens configured to direct incoherent light over one or more programmable filter devices; and
an imager element configured to detect light and to generate an optical correlator module output signal based on the detected light.

12. A system comprising:
electronic circuitry configured to operate in a digital domain, the electronic circuitry configured to implement at least a portion of a neural network, the neural network comprising a convolutional neural network layer and one or more additional neural network layers, the neural network having parameters determined through neural network training of the convolutional neural network layer and the one or more additional neural network layers; and
an optical correlator module configured to operate in an analog domain, the optical correlator module comprising a programmable spatial filter;
wherein the system is configured to perform operations comprising:
receiving, using the electronic circuitry, an input vector for the neural network in the digital domain;
determining, based on the input vector or based on output generated by a layer of the neural network in response to the neural network receiving the input vector, convolutional layer input data for the convolutional neural network layer of the neural network in the digital domain;
inputting the converted, convolutional layer input data to the optical correlator module that is configured to perform the convolution or correlation computation in the analog domain instead of inputting the convolutional layer input data to the convolutional neural network layer of the neural network in the digital domain, wherein the convolution or correlation computation is performed with the programmable spatial filter being programmed using spatial filter data determined based on parameters determined for the convolutional neural network layer through neural network training, wherein processing performed by the optical correlator module in the analog domain includes performing pixel binning using the optical correlator module;

generating a digital representation of results of the convolution or correlation computation that are output by the optical correlator module; and providing the digital representation of the results of the convolution or correlation computation as input to the one or more additional neural network layers of the neural network for processing in the digital domain, the digital representation being processed using the one or more additional neural network layers of the neural network using the electronic circuitry.

13. The method of claim 1, wherein determining the convolutional layer input data comprises:

obtaining an intermediate neural network output, generated by the electronic circuitry in the digital domain, generated by a layer of the neural network in response to the neural network processing the input vector; and generating the convolutional layer input data based on the intermediate neural network output.

14. The method of claim 1, wherein determining the convolutional layer input data comprises mapping a digital vector to a two-dimensional array whose entries correspond to pixels of a light source or spatial light modulator, wherein the digital vector comprises the input vector or an output of a layer of the neural network in response to the neural network receiving the input vector.

15. The method of claim 1, comprising determining (i) amplitude data for the optical correlator module output and (ii) phase data for the optical correlator module output;

wherein processing the data derived from the optical correlator module output comprises providing input to at least one of the one or more additional neural network layers based on the amplitude data and the phase data.

16. The system of claim 12 wherein the converted, convolutional layer input data comprises a two-dimensional array of intensity values for an element in the optical correlator module; and wherein the digital representation of results comprises an array of values for input to the one or more additional neural network layers.

17. The method of claim 1, wherein the neural network is a feedforward neural network comprising a convolutional neural network layer and one or more additional neural network layers, wherein the neural network has parameters for the convolutional neural network layer and the one or more additional neural network layers determined using neural network training involving backpropagation through the neural network; and wherein the digital representation provided as input to the one or more additional layers is a feature map resulting from the convolution or correlation operation being performed for the input data.

18. The method of claim 1, wherein the neural network is configured to perform a natural language processing task, and the convolution or correlation computation is part of performing the natural language task.

* * * * *